United States Patent
Peng

(10) Patent No.: US 9,677,676 B2
(45) Date of Patent: Jun. 13, 2017

(54) ONE-WAY CHECK VALVE FOR SOLID PARTICULATE FLOW PIPELINE

(71) Applicant: Wanwang Peng, Birmingham, AL (US)

(72) Inventor: Wanwang Peng, Birmingham, AL (US)

(73) Assignee: WanWang Peng, Birmingham, AL (US)

( * ) Notice: Subject to any disclaimer, the term of this patent is extended or adjusted under 35 U.S.C. 154(b) by 14 days.

(21) Appl. No.: 14/737,419

(22) Filed: Jun. 11, 2015

(65) Prior Publication Data

US 2016/0290517 A1    Oct. 6, 2016

(30) Foreign Application Priority Data

Apr. 2, 2015  (CN) .................... 2015 2 0197732 U

(51) Int. Cl.
| | |
|---|---|
| F16K 15/03 | (2006.01) |
| F16K 15/02 | (2006.01) |
| F16K 17/12 | (2006.01) |

(52) U.S. Cl.
CPC ............ F16K 15/03 (2013.01); F16K 15/021 (2013.01); F16K 17/12 (2013.01)

(58) Field of Classification Search
CPC ...... F16K 15/03; F16K 15/031; F16K 15/033; F16K 15/035; F16K 15/036; F16K 15/038

USPC ............. 137/527, 527.2, 527.4, 527.6, 527.8
See application file for complete search history.

(56) References Cited

U.S. PATENT DOCUMENTS

| | | | | | |
|---|---|---|---|---|---|
| 662,711 | A | * | 11/1900 | Dewar ................... | B01D 61/08 137/238 |
| 2,328,419 | A | * | 8/1943 | Brown ................... | F16K 1/2028 137/527.6 |
| 2,578,590 | A | * | 12/1951 | Ainslie ................... | F16K 15/03 137/493.5 |
| 3,934,608 | A | * | 1/1976 | Guyton ................... | F16K 15/03 137/527.8 |
| 4,469,122 | A | * | 9/1984 | Meek ....................... | F16K 15/03 137/312 |
| 2008/0023079 | A1 | * | 1/2008 | Dickenscheid ...... | F02M 59/462 137/511 |
| 2014/0041585 | A1 | * | 2/2014 | Hsu ......................... | C23C 14/56 118/715 |

FOREIGN PATENT DOCUMENTS

GB    695589 A  *  8/1953  ............. F16K 15/03

* cited by examiner

*Primary Examiner* — Craig Schneider
*Assistant Examiner* — Paul J Gray

(57) ABSTRACT

A one-way check valve for solid particulate flow pipeline is disclosed suitable for use in a pressure fluid line containing fine particles of solids. The one way valve increases the reliability and safety of the process operations and simplifies the pipeline detection and control requirements.

3 Claims, 3 Drawing Sheets

ONE-WAY CHECK VALVE FOR SOLID PARTICULATE FLOW PIPELINE

FIELD OF THE INVENTION

The invention relates to a one-way valve, particularly a one-way check valve in the main application of solid particulate pipelines.

BACKGROUND OF THE INVENTION

To ensure the safe and stable operation of pressurized fluid pipelines for gas or liquids a one-way check valve arrangement can be installed to ensure that backflow does not occur. A variety of structural types of one way check valve suitable for gas or liquid are available in the market.

In the process of pulverized coal pressurized combustion, gasification, etc., generally pulverized coal is pressurized and delivered through a conveying line to pressure reactor. During normal operation, the pressure in the source of pulverized coal is higher than reactor pressure, thus the gas-solid mixture flows continuous towards the reactor. However, in unusual circumstances, such as a sudden drop in upstream pressure, or mechanical damage along the transport pipeline and before any instrumentation detects and implements control measures, the hot reactor materials may flow back into the fluid conveying line. This is definitely not allowed in a production setup. For high-pressure high-temperature reactors, high-temperature materials backflow to a metal line may result in disastrous consequences. Therefore, the solid delivery pipeline also needs to equipped with a check valve or similar device, in order to ensure secure delivery of materials.

Unlike the use of check valves for gas and liquid pipelines, if a traditional check valve is used in a solid flow, the solid particles may reach and remain within the valve. The accumulation of said solid particulates may result in partial or complete loss of function of check valve. Further, the solid-containing fluid line may suffer erosion problems. The solid concentration and the velocity of fluid are major factors contributing to erosion of the valve body. The conventional type of check valve uses a flow barrier component to dynamically throttle flow area (induce higher velocity) and generate a flow pressure difference across the barrier to balance with a force, for example, the weight of the barrier component. The flow barrier component is set such that it only move towards one direction and holds tight if flow from other direction occurs. The flow barrier generally changes the fluid flow direction inside the valve body, and the changed flow direction is normally random. The higher velocity around the barrier component and the flow direction change all contribute significantly to the erosion of valve body, once there are solids particles present, leading to the damage of the valve body. Malfunction and erosion of the check valve caused by solid particles increases the complexity of designing suitable solids fluid check valves.

SUMMARY OF THE INVENTION

A one-way check valve for solid particulate flow pipeline with valve body, wherein the bottom of the body possesses an outlet, an inlet on said valve body sidewall, said inlet equipped with inlet insert pipe, said inlet insert conduit extends to the inner of said valve body, the inside of said valve body provided with a hollow hemisphere, the diameter of the said hollow hemisphere is greater than the outer diameter of the inlet insert, the hollow hemisphere will cover the end of inlet insert.

A one-way valve, wherein the end of the inlet insert is attached an annular plate, said annular plate has a center opening matching the inlet insert, said annular end face is embed with seal surface, edge of hollow hemisphere contacts with the annular plate seal surface.

A one-way valve, wherein the body wall has a support point and a lever connected in one end to an anchor, and the other to the outer surface of the movable hollow hemisphere, said hollow hemisphere is freely movable hanging by upper lever. The said one-way valve, wherein a spring is attached to said inside valve body and points to the outer surface of the hollow hemispherical.

A one-way valve, wherein said inner wall has an abrasion-proof material liner in the region of around the hollow hemisphere.

The said one-way valve, wherein connected with the said inlet insert is a semicircular body, which has an vertical discharge section, the bottom of the semicircle body is aligned with the bottom of inlet insert.

The said hollow hemisphere is located above the discharge section, and the lumen of the said hollow hemisphere is facing the discharge section, the size of hollow hemisphere is larger than the discharge section A one-way valve, wherein a downward pointing cone in attached to the inside of the said hollow hemisphere. A one-way valve, characterized in that a spring is located on top of hollow hemisphere.

A one-way valve, wherein said inlet conduit exit is provided at the top end of the valve body extending along a vertical baffle and the said lower body is also provided with an auxiliary gas inlet nozzle.

The one way check valve of the present invention is suitable for pressure fluid containing fine particulate solids, preferably in gas flow with a relatively dilute solid phase, it can guide the fine particulate solids conveying along a single direction in the pipeline, which effectively increases the reliability and safety of the process operations and also simplifies the pipeline detection and control requirements. The one way check valve of the present invention is applicable to a wide range of operating conditions, the pressure may be about 0.2~10 MPa, temperature may be about 35~750 C, the solid particle size may be about 0~10 mm. The check valve of the present invention is suitable for pneumatic conveying solid phase flow lines and also liquid-solid phase fluids such as coal-water slurry, coal-oil slurry transportation line and other flow lines known in the art.

BRIEF DESCRIPTION OF THE DRAWINGS

The accompanying drawing(s), which are incorporated in and constitute a part of this specification, illustrate several aspects as described below.

DETAILED DESCRIPTION OF THE PREFERRED EMBODIMENTS

It is to be understood that this invention is not limited to particular embodiments described, as such may, of course, vary. It is also to be understood that the terminology used herein is for the purpose of describing particular embodiments only, and is not intended to be limiting, since the scope of this invention will be limited only by the appended claims.

The detailed description of the invention is divided into various sections only for the reader's convenience and disclosure found in any section may be combined with that in another section. Unless defined otherwise, all technical and scientific terms used herein have the same meaning as commonly understood by one of ordinary skill in the art to which this invention belongs.

It must be noted that as used herein and in the appended claims, the singular forms "a", "an", and "the" include plural referents unless the context clearly dictates otherwise. Thus, for example, reference to "a compound" includes a plurality of compounds.

Figure 1:
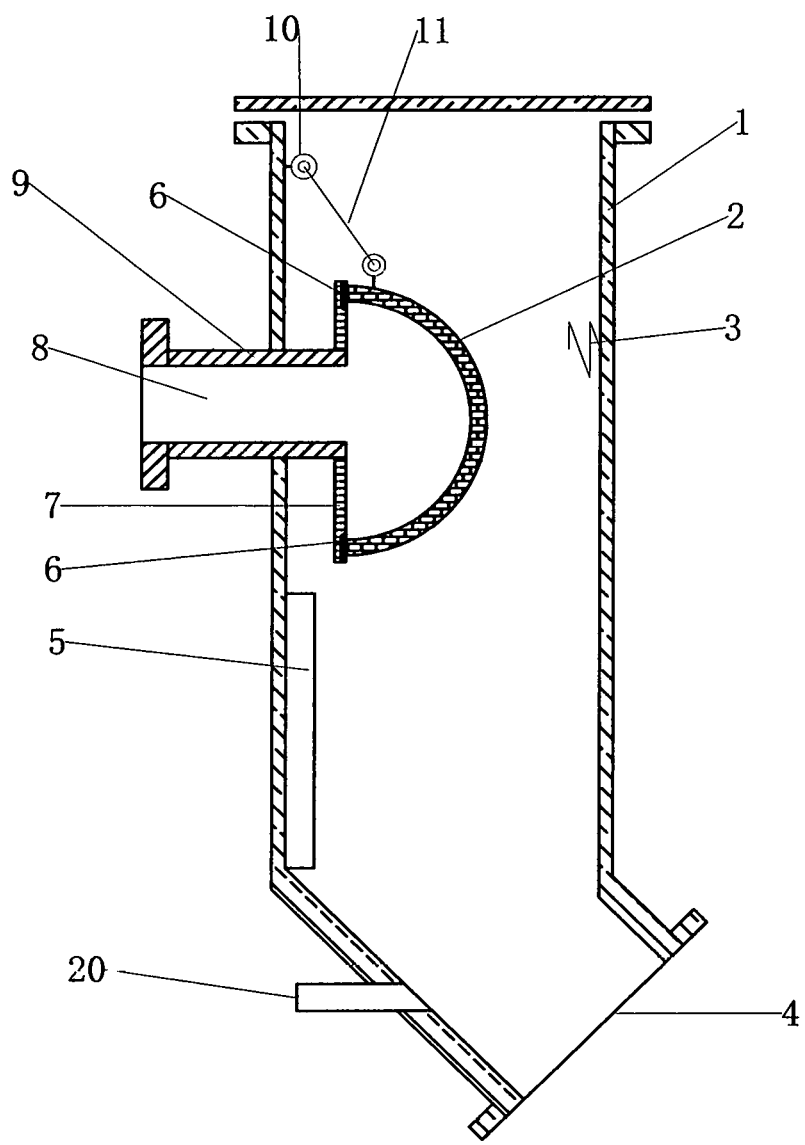
FIG. 1 is a schematic structural drawing of a practical embodiment of the check valve in the closed state.
Figure 2:
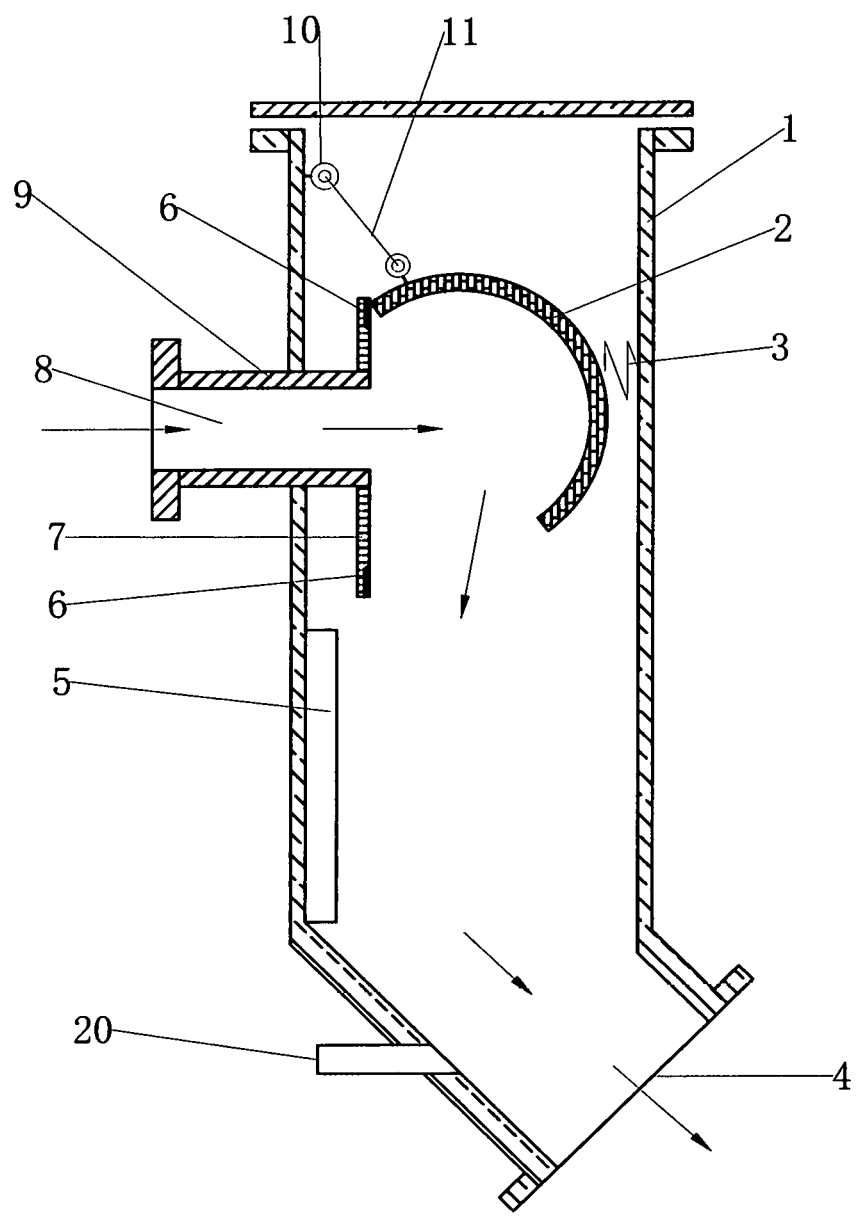
FIG. 2 is a schematic structural drawing of a practical embodiment of the check valve in the opened state of opening.

In order to facilitate understanding of those skill in the art, the following embodiment of the invention is further described in combination with the drawings. As shown in FIGS. 1 and 2, the invention discloses a one-way check valve includes a valve body 1, a valve at the bottom with an outlet 4, the outlet 4 is set inclined preferably, the body 1 is provided on the side wall with inlet 9, inlet 9 is equipped with an inlet insert 8, the outlet end of the inlet insert 8 extends to the inside of body 1, the valve body is provided with a movable inner hollow hemisphere 2, the diameter of the hollow hemisphere 2 is greater than the outer diameter of the inlet insert 8, the cutting section area of the hollow hemisphere 2 covers the end of the inlet insert. Inlet 9 is usually horizontal and directly perpendicular to the side wall of the valve body 1, the valve body is a barrel, and an inner diameter of valve body is larger than the outer diameter of inlet insert, the diameter of hollow hemisphere is also greater than the outer diameter of the inlet insert, so as to ensure the outlet end of inlet insert is covered by the hollow hemisphere cutting section area.

The invention has the following two preferred embodiments for the setting of the hollow hemisphere, One embodiment, as shown in FIG. 1, wherein the outlet end of the inlet insert 8 and mounted annular flat plate 7 has an opening matching the inlet insert pipe opening, on the surface of the annular plate 7 is the sealing ring 6, the edge of upper section of hollow hemisphere 2 is located above the inlet insert 8, and in contact with the sealing ring 6, the edge of lower portion of the hollow hemisphere 2 is freely hanging and is located below the inlet insert 8, and a lower portion in contact with the sealing ring 6. The inner wall of the valve body 1 has a support point 10 and the lever 11, the lever 11 is connected at one end to the anchor 10, and the other end to the outer surface of the movable hollow hemisphere. Only the upper of entire hollow hemisphere is suspended with the lever, therefore, the lower portion of hollow hemisphere may freely drop and contact closely with the sealing ring.

A spring 3 is located within the valve body 1 and opposite to the inlet insert and outer surface of hollow hemisphere. The spring 3 can restrict the movement of the hollow hemisphere. The lower region of inner side wall of the hollow body is equipped with wear resistant cushion 5. The inside wall of the valve body may also be provided with a wear-resistant layer. A protective layer to the inner surface of valve body is provided to ensure valve body is protected and not eroded by contact with solid particles. The lower part of the body 1 also has an auxiliary intake port 20. The auxiliary intake port 20 for gas flow is used to accelerate the solid fluid out of the one-way valve and does not present any accumulated solids.

In the case of one embodiment as shown in FIG. 1, the check valve is in the closed state, the edge of lower portion of the hollow hemispherical is in close contact with the lower portion of the sealing ring, the hollow hemisphere has an upper also has contact with the upper sealing ring. When a fluid mixture with fine particles of solid material moves from conveying line to the valve inlet, the fluid flows through the inlet insert and enters the inside of valve body. Due to the pressure of the fluid, the hollow hemisphere is pushed away by the fluid, the bottom edge of hollow hemisphere is no longer in contact with the sealing ring, as shown in FIG. 2. At this time fluid comprising fine particulate material will move through the gap opening between the hollow hemisphere and the seal ring, and the fluid further moves down and exit the bottom outlet. When the fluid comprising fine particles of solid material has higher velocity and greater pressure, the hollow hemisphere travels more and opens the gap further. When the hollow hemisphere moves further and further open, the spring will limit the stroke and play a buffering role, to prevent the outer surface of the hemisphere not to be in direct contact with the body wall. When the fluid with fine particles of solid material stops flowing into the valve body, the hollow hemisphere has no pressure to be pushed away, it will therefore drop by gravity to its lowest position and the valve close.

Figure 3:
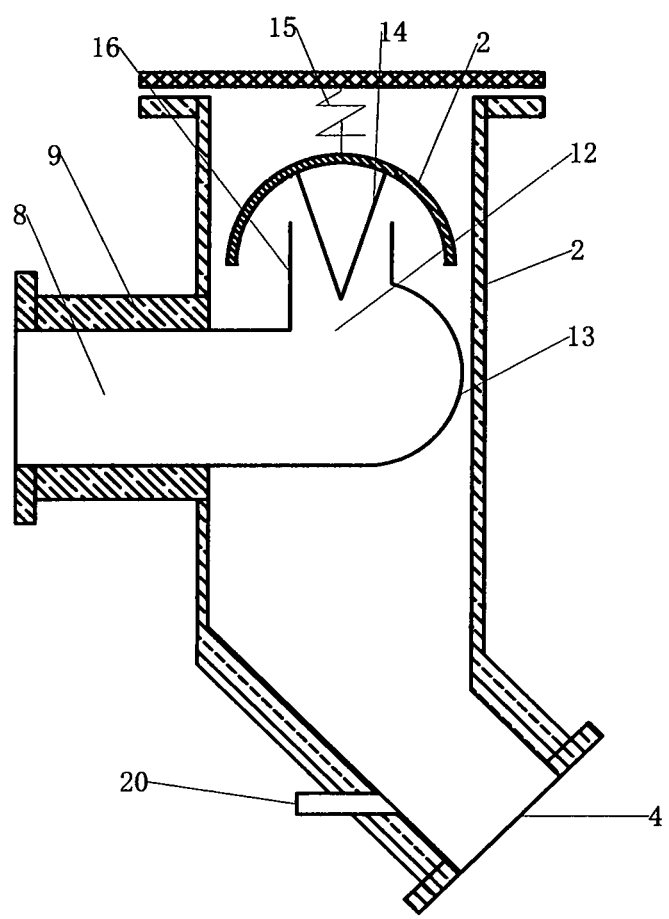
FIG. 3 is a schematic cross-sectional structure drawing of another embodiment

Example II, shown in FIG. 3, the inside of the valve body 1, connected to the end of inlet insert 8 is provided with a curved semicircle 13, an vertical discharge port 12 is also connected with the curved semicircle 13. The inlet insert bottom is aligned with the bottom of curved semicircle 13. The hollow hemisphere 2 is located up above the discharge port 12, and the cavity of hollow hemisphere 2 faces down towards the discharge port 12, the diameter of the hollow hemisphere is larger than the diameter of the discharge port opening upward, the hollow hemisphere will move up a certain distance by impact force from the flow of fluid with fine particulates. When in actual use, the center of the hollow hemisphere 2 and center of discharge port upward are aligned, to ensure the hollow hemisphere will cover all discharge port area. The flow guiding cone 14 points towards the discharge port 12, which will guide and distribute the fluid from discharge port. A spring 15 is set on top of the inner valve body 1 and above the hollow hemisphere 2, the spring 15 will limit the stroke of the hollow hemisphere 2 will be and so the hollow hemisphere 2 can only move a certain distance in an upward stroke.

The curved semi-semicircle is set such that it can change the flow direction of the fine particles and reduce material wear and tear on the internal parts. In example 2, fluid flows horizontally into the valve body, then around the curved semi-semicircle, the upflow fluid impacts upon the hollow hemisphere, pushes the hemisphere up and away from the discharge port, guided by the cone and the surface of hollow hemisphere, the fluid then turns down.

What is claimed is:
1. A one-way check valve for a solid particulate flow pipeline, the one-way check valve comprising
   a hollow cylindrical valve body having a top, a bottom and a side, wherein the valve body is vertical positioned,
   an outlet connected to the bottom of the hollow valve body, an inlet connected to the side of the valve body, wherein the inlet is orthogonally connected with the side of the valve body, an inlet insert extending into an inner potion of the valve body, an annular plate attached to the end of the inlet insert, wherein the annular plate having greater diameter than the inlet insert; wherein a sealing surface is attached to an end face of the annular plate, a movable hollow hemisphere positioned near an end of the inlet insert, having a greater diameter than the outer diameter of the inlet insert such that the movable hollow hemisphere is configured to cover the annular plate on the sealing surface, an anchor connected to the inner upper section of the valve body, a lever having an anchor in one end, wherein the anchor also in connection with the upper outer surface of the hemisphere, wherein the connection between the anchor and the lever and the connection between the lever and the hemisphere are rotatable, a spring attached within the hollow valve body, and wherein the spring is configured to stop an excessive movement of the movable hollow hemispherical, an auxiliary gas inlet nozzle located at the lower outer side of the valve body and below the inlet insert.

2. The one-way check valve according to claim 1, wherein a portion of the inner surface of the valve body near the movable hollow hemisphere has an abrasion-proof material liner.

3. A one-way check valve comprising
a vertical cylinder-shaped hollow valve body having a top, a bottom and a side an outlet near a bottom of the valve body;
an horizontal inlet on the side of the valve body, the inlet having an inlet insert straightly extending into an inner portion of the valve body;
an annular plate, { }an { }inner opening of the annular plate matching an outer diameter of the inlet insert; and
a sealable surface attached to an end face of the annular plate;
a movable hollow hemisphere having an outer surface, an inner surface and a ring surface;
an anchor attached to an upper portion of an inner surface of the valve body;
a lever having a first end connected to the anchor and a second end connected to the outer surface of the movable hollow hemisphere; and
a spring opposite the inlet insert, the spring being attached to a mid-range portion of the inner surface of the valve body;
wherein the one-way check valve is characterized by
a closed condition in which
the inlet pressure is same or lower than the outlet pressure:
an upper end of the ring surface of the movable hollow hemisphere contacts an upper portion of the seal surface;
a lower end of the ring surface of the movable hollow hemisphere contacts a lower portion of the seal surface; and
the outer surface of the movable hollow hemisphere does not contact the spring;
an open condition in which
the inlet pressure is higher than outlet pressure;
the upper end of the ring surface of the movable hollow hemisphere contacts the upper portion of the sealing surface;
the lower end of the ring surface of the movable hollow hemisphere does not contact the lower portion of the seal surface; and
the outer surface of the movable hollow hemisphere contacts the spring;
a solid particulates flow stream enters the inlet, passes through the insert, hits the hemisphere inner surface, turns a direction to downward, then leaves the one way check valve through the valve outlet;
in the solid particulates flow stream a solid particle size is in the range of 0~10 mm, and the pressure in the one way check way is in the range of 0.2 to 10 MPa.

* * * * *